(12) United States Patent
Nomura

(10) Patent No.: US 8,764,352 B2
(45) Date of Patent: Jul. 1, 2014

(54) THROWAWAY TIP FOR DEEP-HOLE DRILLING AND DRILL HEAD FOR DEEP-HOLE DRILLING

(75) Inventor: Takuji Nomura, Hyogo (JP)

(73) Assignee: Unitac, Incorporated, Hyogo (JP)

( * ) Notice: Subject to any disclaimer, the term of this patent is extended or adjusted under 35 U.S.C. 154(b) by 889 days.

(21) Appl. No.: 12/911,437

(22) Filed: Oct. 25, 2010

(65) Prior Publication Data

US 2011/0091296 A1 Apr. 21, 2011

Related U.S. Application Data

(63) Continuation-in-part of application No. PCT/JP2008/072628, filed on Dec. 12, 2008.

(30) Foreign Application Priority Data

Apr. 25, 2008 (JP) .................................. 2008-115158

(51) Int. Cl.
*B23B 41/02* (2006.01)

(52) U.S. Cl.
USPC ............ 407/113; 408/223; 408/227; 408/713

(58) Field of Classification Search
USPC ................. 408/224, 113, 223, 227, 713, 188; 407/113
See application file for complete search history.

(56) References Cited

U.S. PATENT DOCUMENTS

| | | | | |
|---|---|---|---|---|
| 4,859,123 A | * | 8/1989 | Koesashi et al. | 408/233 |
| 4,889,455 A | * | 12/1989 | Karlsson et al. | 408/188 |
| 4,889,456 A | * | 12/1989 | Killinger | 408/224 |
| 5,509,761 A | * | 4/1996 | Grossman et al. | 408/59 |
| 5,848,861 A | * | 12/1998 | Hansen | 408/143 |
| 5,964,553 A | * | 10/1999 | Blomberg et al. | 408/224 |
| 7,004,691 B2 | * | 2/2006 | Nomura | 408/59 |

FOREIGN PATENT DOCUMENTS

| | | |
|---|---|---|
| JP | S58-034706 | 3/1983 |
| JP | 07-068408 | 3/1995 |
| JP | 2003-025129 | 1/2003 |
| JP | 2003-236713 | 8/2003 |
| JP | 2006-082180 | 3/2006 |

OTHER PUBLICATIONS

International Search Report in PCT/JP2008/072628, dated Mar. 17, 2009.

* cited by examiner

*Primary Examiner* — Andrea Wellington
*Assistant Examiner* — Brendan Ayer
(74) *Attorney, Agent, or Firm* — Womble Carlyle

(57) ABSTRACT

A three-way indexable throwaway tip for deep-hole drilling can be used as a center cutting blade body for a drill head in either whole cutting type or uncut core break-off type applications. The throwaway tip for deep-hole drilling is of a thick plate body having a three-fold symmetry with three cutting sections that are rotationally spaced apart at a central angle of 120 degrees. When mounted on a drill head, one cutting section of the throwaway tip faces a drilling direction. The forward facing blade edge of that cutting section includes an inner blade edge shorter in blade length and an outer blade edge longer in blade length forming an apex. The outer blade edge is composed of two consecutive blade edge portions of a peak-side outer blade edge portion having a smaller outer blade edge angle and a corner-side outer blade edge portion having a larger outer blade edge angle.

2 Claims, 8 Drawing Sheets

THROWAWAY TIP FOR DEEP-HOLE DRILLING AND DRILL HEAD FOR DEEP-HOLE DRILLING

RELATED APPLICATIONS

This is a continuation-in-part of international application no. PCT/JP2008/072628, filed 12 Dec. 2008, which published as WO 2009/130821A1 and claims priority to JP2008-115158, filed 25 Apr. 2008. The contents of the aforementioned applications are incorporated by reference in their entirety.

TECHNICAL FIELD

The present invention relates to a throwaway tip for deep-hole drilling having a three-fold symmetry and a drill head for deep-hole drilling using the same.

BACKGROUND

There has conventionally been a drill head for deep-hole drilling employing a throwaway tip for a blade body, as shown in FIG. 8(A) and FIG. 8(B), for example. This drill head 50 has a substantially cylindrical head main body 51 with a hollow portion 52 opened at a proximal end side and a head distal end surface 51a of a substantially obtuse conical shape provided with one large and one small cutting chip discharge port 53A, 53B forming a substantially fan shape whose central angle is 90 degrees and communicating with the hollow portion 52. A center cutting blade body 54A and a circumference side blade body 54B are formed on an opening side edge of the large cutting chip discharge port 53A along a head radial direction D, and an intermediate portion blade body 54C is formed on an opening side edge of the small cutting chip discharge port 53B along the same head radial direction D by screw-clamping throwaway tips 60 on recessed mounting seats of the head main body 51 side, respectively. Further, on an outer circumferential surface 51b of the head main body 51, guide pads 55A to 55D are screw-clamped at the distal end side and a male thread 56 is provided at the proximal end side.

In deep-hole drilling work, a proximal portion side of the drill head 50 is threaded into and mounted on a distal end portion of a hollow boring bar (not shown) by the male thread 56, and the boring bar is coupled to a driving shaft such as a spindle of a machine tool to be rotatingly-driven or otherwise rotate a work material, thereby drilling the work material by cutting bodies 54A to 54C to form a deep-hole. Moreover, it is noted that a relative rotation direction of the drill head 50 is a counterclockwise direction in FIG. 8(A). During the deep-hole drilling work, a coolant is supplied into a cutting region through a gap between a cutting hole and the boring bar at high pressure, made to flow from the cutting chip discharge ports 53A, 53B into the hollow portion 52 together with cutting chips generated in the cutting region, and discharged outside through the inside of the hollow boring bar.

The throwaway tip 60 on this occasion is of a hexagonal thick plate body shape, has a three-fold symmetry in which a sectional shape when divided into three sections at the central angle of 120 degrees is equalized, and has an inner blade edge 62 shorter in blade length and an outer blade edge 61 longer in blade length adjacent to each other and constituting one unit of an angular shaped blade portion. That is, each throwaway tip 60 is mounted by a fixing bolt 63 having passed through a bolt insertion hole provided at the center thereof in such a manner that an angular shaped blade portion at one place faces the front end of the head main body as a blade edge. When the angular shaped blade portion reaches its wear limit or gets damaged, the mounting posture is turned 120 degrees and a new angular shaped blade portion can be made to face the front end. As a result, the throwaway tip has an advantage of being usable three times in total by rotating the tip to present a new blade edge and thus having a longer service life. See Japanese Published Unexamined Patent Application No. H07-068408.

On the other hand, this kind of drill head 50 carries out whole cutting so that an entire cutting hole is formed by drilling. Therefore, the center cutting blade body 54A responsible for cutting the central portion of a cutting hole is required to be precisely positioned and mounted in such a manner that a blade edge matches with a diametral line D about a head shaft center axis O and an inner end 62a of the inner blade edge 62 is arranged slightly beyond the head shaft center axis O. Therefore, a cutting rate becomes zero theoretically at the head shaft center axis O during deep-hole drilling work, and thus, a blade edge portion positioned in the shaft center O does not exert a cutting force as what is referred to as a chisel edge, which results in crushing a work material, and thrust resistance is loaded. As a result, this has been a factor that cutting efficiency cannot be enhanced.

Consequently, as for a deep-hole drilling tool employing a throwaway tip with a two-fold symmetry as a blade body, more specifically, a throwaway tip of a parallelogrammatic thick plate body, having blade edges on opposed two sides and being usable twice in total by replacing the blade edge by a 180 degree turn, the present inventor has already proposed one configured such that a sinking portion is provided to a tip side surface at a blade edge inner end side, and the blade edge inner end is arranged spaced apart from the head shaft center axis, thereby forming a non-cutting zone in the vicinity of the shaft center and breaking off an uncut core of a work material generated in the non-cutting zone by press-contacting with an inclined step of the sinking portion. See Japanese Published Unexamined Patent Application No. 2003-25129 & Japanese Published Unexamined Patent Application No. 2003-236713.

However, when the inner end of the blade edge is arranged so as to be spaced apart from the head shaft center axis in the three-fold symmetric throwaway tip 60 as used in the drill head as shown in FIG. 8, there is a concern that the uncut core of the work material generated in the non-cutting zone cannot be broken off as in the afore-described two-fold symmetric throwaway tip and the uncut core grows long, thereby degrading cutting chip dischargeability and additionally causing a cutting chip clogging, which falls into cutting inability. As a result, the three-fold symmetric throwaway tip has been applicable only to the normal whole cutting type.

SUMMARY OF THE INVENTION

The present invention was made in view of the foregoing circumstances, and accordingly it is an object of the present invention to provide a three-fold symmetric throwaway tip for deep-hole drilling applicable to both a whole cutting type and an uncut core break-off type as a center cutting blade body for a drill head and a drill head for deep-hole drilling employing this throwaway tip.

Means for achieving the aforementioned object will be described with reference numerals of the accompanying drawings. A three-way indexable throwaway tip for deep-hole drilling according to a first aspect of the present invention includes a plate body having three convex cutting sections P1 to P3 rotationally spaced apart from one another by 120 degrees. A plate corner is provided between each pair of adjacent convex cutting sections. Each convex cutting section comprises a blade edge between a first plate corner and an adjacent second plate corner. The blade edge comprises: an inner blade edge extending between the first plate corner and a section apex; and an outer blade edge extending between the section apex and the adjacent second plate corner, the outer blade edge being longer than the inner blade edge and comprising a peak-side outer blade edge portion and a corner-side outer blade edge portion, the peak-side outer blade edge portion forming an obtuse angle with the corner-side outer blade edge portion, the peak-side outer blade edge portion being connected to the section apex, the corner-side outer blade edge portion being connected to the adjacent second plate corner. In a front view of the throwaway tip, an adjacent inner blade edge extends along a longitudinal imaginary reference line (L) between the adjacent second plate corner and an adjacent section apex; a transverse imaginary line (e) perpendicular to the longitudinal imaginary reference line (L) contains the section apex; the inner blade edge forms an inner blade edge angle ($\alpha$) with the transverse imaginary line (e); the peak-side outer blade edge portion forms a first angle ($\beta_1$) with transverse imaginary line (e); the corner-side outer blade edge portion forms a second angle ($\beta_2$) with transverse imaginary line (e); and the second angle is greater than the first angle.

Thus, a blade edge 1 facing a drilling direction in a mounting state on a drill head D1 (see FIGS. 2 to 4), D2 (see FIG. 5) has an inner blade edge 11 shorter in blade length and an outer blade edge 12 longer in blade length forming an angular shape corresponding to one of the sections (first section P1) and the outer blade edge 12 is composed of two consecutive blade edge portions of a peak-side outer blade edge portion 12a having a smaller outer blade edge angle $\beta_1$ (first angle) and a corner-side outer blade edge portion 12b having a larger outer blade edge angle $\beta_2$ (second angle) in the angular shape.

A second aspect of the present invention is configured such that a flank face 13 along the corner-side outer blade edge portion 12b has a flank angle $\theta$ set in the range of 5 to 15 degrees in the throwaway tip for deep-hole drilling of the first aspect.

A third aspect of the present invention is configured such that a margin 14 is formed along the inner blade edge 11 in the throwaway tip for deep-hole drilling of the first aspect.

A fourth aspect of the present invention is configured such that a corner-side outer blade edge portion 12b at a blade edge 1 in one of the sections (second section P2) facing a head shaft center axis O side in a mounting state on the drill head D1, D2 and an inner blade edge 11 at a blade edge 1 in one of the other sections (third section P3) facing a head outer circumference side in the same mounting state are arranged so as to be parallel to each other (see FIGS. 2 to 5) or so as for extension lines L1, L2 forward in the drilling direction of respective blade edges to intersect with each other (see FIG. 6 and FIG. 7) in the throwaway tip for deep-hole drilling of the first aspect.

A drill head for deep-hole drilling according to a fifth aspect of the present invention is configured such that blade bodies 3A to 3C cooperating to drill a work material W are screw-clamped and fixed at a plurality of places including at least at the center and at the circumference of a distal end surface 2a of a cylindrical head main body 2, respectively, and at least the center cutting blade body 3A is composed of the throwaway tip for deep-hole drilling T1, T2 of the first aspect as described above.

A sixth aspect of the present invention is configured such that the center cutting throwaway tip T1, T2 (center cutting blade body 3A) has an entire blade edge arranged in parallel with a radial line R about a head shaft center axis O and in a center-raised position more forward in a cutting rotation direction than the radial line R, and an inner end 11a of an inner blade edge 11 at a blade edge 1 in one of the cutting sections (first section P1) facing a drilling direction spaced apart from the head shaft center axis O and forming a non-cutting zone Z in the vicinity of the shaft center O in the drill head for deep-hole drilling of the afore-described fifth aspect.

A seventh aspect of the present invention is configured such that the center cutting throwaway tip T1, T2 (center cutting blade body 3A) has an entire blade edge arranged in a center-raised position 0.2 to 1.5 mm more forward in a cutting rotation direction than a radial line R about a head shaft center axis O, and an inner end 11a of an inner blade edge 11 at a blade edge 1 in one of the cutting sections (first section P1) facing a drilling direction spaced 0.05 to 0.5 mm apart from the head shaft center axis O in the drill head for deep-hole drilling of the sixth aspect as described above.

An eighth aspect of the present invention is configured such that the center cutting throwaway tip T1, T2 (center cutting blade body 3A) has an entire blade edge arranged along a radial line R about a head shaft center axis O, and an inner end 11a of an inner blade edge 11 at a blade edge 1 in one of the cutting sections (first section P1) facing a drilling direction arranged in a position beyond the head shaft center axis O in the drill head for deep-hole drilling of the afore-described fifth aspect.

A ninth aspect of the present invention is configured such that the circumference side blade body 3B is composed of the throwaway tip T1, T2 of the afore-described third aspect, and the throwaway tip T1, T2 has an inner blade edge 11 at a blade edge 1 in one of the sections (third section P3) facing a head outer circumference side arranged in parallel with the head shaft center axis O in the drill head for deep-hole drilling of the afore-described fifth aspect.

A tenth aspect of the present invention is configured such that at least three blade bodies 3A to 3C, including center cutting, circumferential cutting and intermediate portion cutting blade bodies, are provided and the blade bodies 3A to 3C are all composed of any one of the throwaway tips for deep-hole drilling T1, T2 of the first to the fourth aspect in any one of the drill heads for deep-hole drilling of the fifth to the ninth aspects as described above.

Effects of the present invention will be described with reference numerals of the drawings. First, in the throwaway tip for deep-hole drilling T1, T2 according to the first aspect of the present invention, each section of a cutting blade having a three-fold symmetry and divided into three cutting sections P1 to P3 has an inner blade edge 11 and an outer blade edge 12 forming an angular shape, and the outer blade edge 12 is also formed into an angular shape by a peak-side outer blade edge portion 12a and a corner-side outer blade edge portion 12b. A flank face 13 along the corner-side outer blade edge portion 12b has a flank angle $\theta$ in a specific range.

Accordingly, when used as a center cutting blade body 3A for a drill head D1, D2, the throwaway tip is prepared for an uncut core break-off type such that an entire blade edge is arranged in a center-raised position and an inner end 11a of an inner blade edge 11 at a blade edge in one of the cutting sections (first section P1) facing a drilling direction is spaced apart from a head shaft center axis O to form a non-cutting zone Z, whereupon a flank face 13 along a corner-side outer blade edge portion 12b in one section (second section P2) facing the head shaft center axis O side enters into the non-cutting zone Z. Thus, an uncut core C generated in the non-cutting zone Z is press-contacted by the flank face 13 from the side, pushed away laterally, twisted due to changes in the pushed-away direction in line with rotation of the drill head D1, D2, and constricted by as much as the flank face 13 enters into the non-cutting zone Z. As a result, the uncut core C is fragmented little by little without growing long, whereupon excellent cutting chip dischargeability is secured during deep-hole drilling work and high cutting efficiency is attained in cooperation with an elimination of the chisel edge in the shaft center position.

On the other hand, this throwaway tip for deep-hole drilling T1, T2 can also be used as a center cutting blade body 3A for the drill head D2 in deep-hole drilling work by the normal whole cutting type. That is, a throwaway tip is generally fitted into and screw-clamped at a recessed portion of a head main body side via a tip mounting plate. Thus, a plate which can arrange the throwaway tip T1, T2 such that an entire blade edge thereof is along a radial line R about a head shaft center axis O and an inner end 11a of an inner blade edge 11 in one cutting section (first section P1) facing a drilling direction is positioned slightly beyond the head shaft center axis O is used as the tip mounting plate 5, thereby being applicable to the whole cutting type without any problem. Further, a plate different in holding position of the throwaway tip T1, T2 is prepared as the tip mounting plate 5, thereby allowing even the drill head D2 of an existing whole cutting type specification to be used in both the original whole cutting type and the uncut core break-off type.

According to the second aspect of the present invention, when a flank angle of the flank face 13 of the corner-side outer blade edge portion 12b is less than 5 degrees, a problem is caused in the cutting function of the corner-side outer blade edge 12b in the first cutting section P1 facing the drilling direction. Whereas when the flank angle exceeds 15 degrees, the entering by an edge 13a of the flank face 13 into the non-cutting zone Z becomes deficient and resulting fragmentation performance of the uncut core C is reduced.

According to the third aspect of the present invention, the throwaway tip for deep-hole drilling T1, T2 is formed with a margin 14 along the inner blade edge 11 and accordingly can advantageously be used as a circumference side blade body 3B as well as the center cutting blade body 3A for the drill head D1, D2. In this case, the circumference side blade body 3B is configured such that an inner blade edge 11 in one section (third section P3) facing a head outer circumference side is arranged so as to be parallel to a head rotation axis and the inner blade edge 11 is linearly contacted with an inner circumference of a cutting hole. However in this case, in addition to that the inner blade edge 11 has a large blade edge angle due to the margin 14 and thus a blade edge thereof is strengthened, the margin 14 portion also slide-contacts with the hole inner circumference. As a result, abrasion of the inner blade edge 11 is reduced and also the inner blade edge 11 resists damage, whereby excellent durability can be attained as the circumference side blade body 3B large in linear velocity.

According to the fourth aspect of the present invention, when the throwaway tip for deep-hole drilling T1, T2 is arranged as a center cutting blade body 3A for the drill head D1 of an uncut core break-off type such that an inner blade edge 11 in one section (third section P3) facing the head circumference side is parallel to the head rotation axis, a corner-side outer blade edge portion 12b in one section (second section P2) facing the head shaft center axis is arranged in parallel with the head shaft center axis O or in an inclined state where a rear end side approaches the head shaft center axis O. As a result, the press-contact by the flank face 13 of the corner-side outer blade edge portion 12b with respect to the uncut core C generated in the non-cutting zone Z becomes more reliable or stronger, whereupon the uncut core C is efficiently fragmented further little by little.

According to the fifth aspect of the present invention, the throwaway tip for deep-hole drilling T1, T2 according to the first aspect is used as at least a center cutting blade body 3A for the drill head D1, D2 for deep-hole drilling in which cutting blade bodies (a center cutting blade body 3A, a circumferential cutting blade body 3B and an intermediate portion cutting blade body 3C) are screw-clamped and fixed at a plurality of places including at least at the center and at the circumference of a distal end surface 2a of a cylindrical head main body 2. Therefore, the drill head D1, D2 can advantageously be used in deep-hole drilling work of both non-cutting core break-off type and whole cutting type depending on arrangement setting of the center cutting throwaway tip T1, T2.

According to the drill head D1 for deep-hole drilling of the sixth aspect of the present invention, the center cutting throwaway tip T1, T2 is arranged in a center-raised position and the blade edge inner end 11a is arranged spaced apart from the head shaft center axis O, as the uncut core break-off type, so that the uncut core C generated in the non-cutting zone Z can be fragmented little by little efficiently, whereupon excellent cutting chip dischargeability during deep-hole drilling work is secured and high cutting efficiency is attained in cooperation with an elimination of the chisel edge in the head shaft center axis O position.

According to the drill head D1 for deep-hole drilling of the seventh aspect of the present invention, a center-raised amount of the center cutting throwaway tip T1, T2 and an eccentric distance of the blade edge inner end 11a are set in a specific range in the uncut core break-off type. As a result, the little by little break-off of the uncut core C generated in the non-cutting zone Z can be carried out more reliably.

According to the drill head D2 for deep-hole drilling of the eighth aspect of the present invention, the center cutting throwaway tip T1, T2 is arranged such that an entire blade edge is along the radial line R about the head shaft center axis O and the inner end 11a of the inner blade edge 11 in one cutting section (first section P1) facing the drilling direction is positioned beyond the head shaft center axis O. As a result, deep-hole drilling work by the whole cutting type can be carried out.

According to the drill head D1, D2 for deep-hole drilling of the ninth aspect of the present invention, the throwaway tip for deep-hole drilling T1, T2 according to the second aspect used for the circumference side blade body 3B is arranged such that the inner blade edge 11 in one of the sections (third section P3) facing the head outer circumference side is parallel to the head shaft direction O. However, the inner blade edge 11 is strengthened by the margin 14, so that abrasion of the inner blade edge 11 is reduced and the inner blade edge 11 resists damage, whereby excellent durability can be attained as the circumference side blade body 3B large in linear velocity.

According to the tenth aspect of the present invention, in the drill head D1, D2 for deep-hole drilling provided with at least three cutting blade bodies including a center cutting blade body, a circumferential cutting blade body, and an intermediate portion cutting blade body, circumference, all cutting blade bodies are composed of the throwaway tip for deep-hole drilling T1, T2 according to any one of the first to the forth aspect, and the throwaway tip T1, T2 can be set in the same posture. As a result, manufacturing costs can be reduced remarkably due to commonality of components and uniformalization of assembly operation.

BRIEF DESCRIPTION OF THE DRAWINGS

FIG. 1(A) is a front view, FIG. 1(B) is a plane view and FIG. 1(C) is a right side view;

FIG. 2(A) is a plane view and FIG. 2(B) is a front view;

FIG. 3(A) is a plane view and FIG. 3(B) is a longitudinal sectional front view;

FIG. 4(A) is a plane view and FIG. 4(B) is a longitudinal sectional front view;

FIG. 5(A) is a plane view and FIG. 5(B) is a longitudinal sectional front view;

FIG. 6(A) is a front view and FIG. 6(B) is a plane view;

FIG. 7(A) is a plane view and FIG. 7(B) is a longitudinal sectional front view; FIG. 8(A) is a plane view and FIG. 8(B) is a front view.

DESCRIPTION OF REFERENCE NUMERALS

Figure 1:
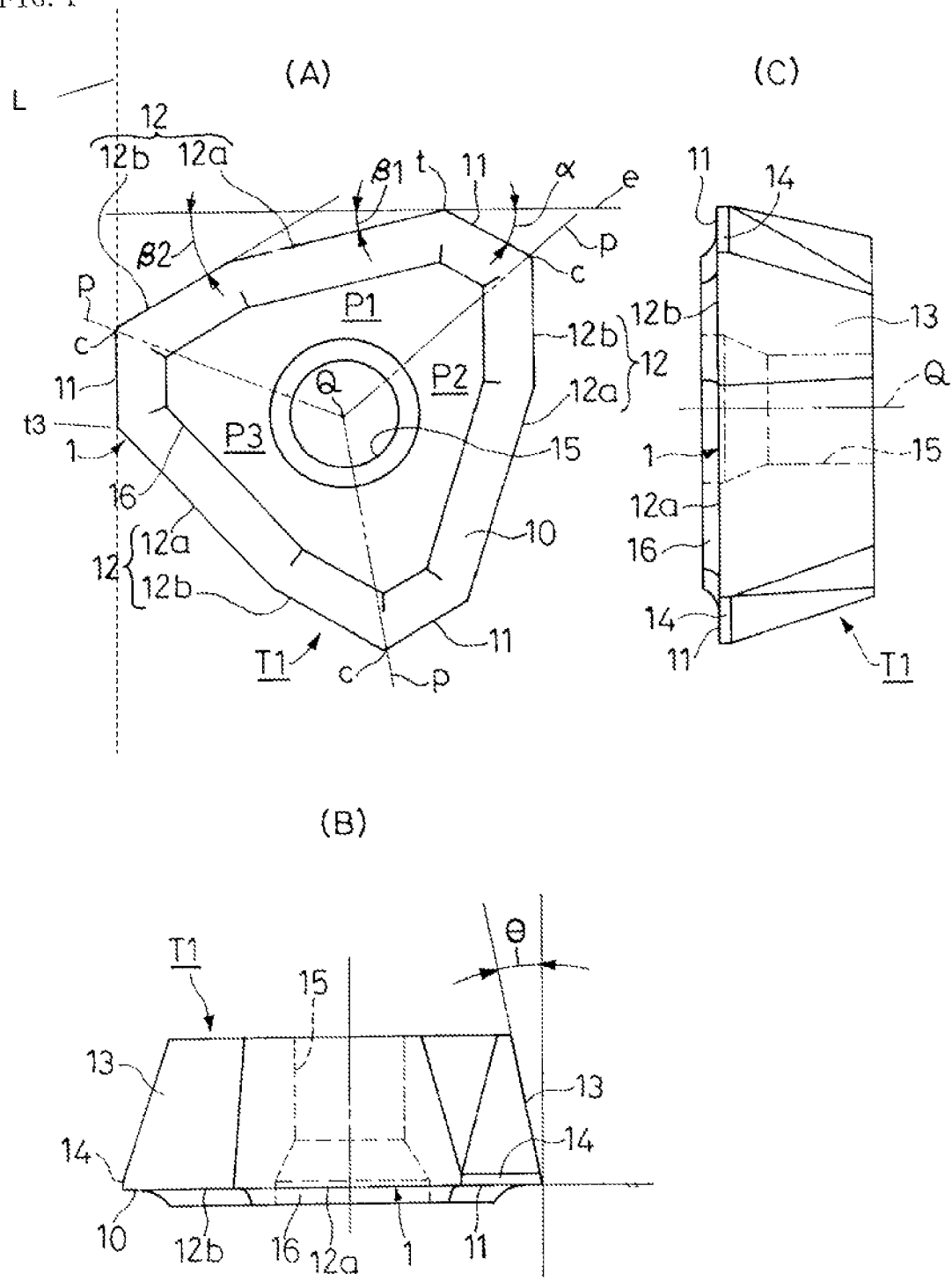
FIG. 1 shows a throwaway tip for deep-hole drilling according to a first embodiment of the present invention.

1: Blade edge
11: Inner blade edge
11a: Inner end surface
12: Outer blade edge
12a: Peak-side outer blade edge portion
12b: Corner-side outer blade edge portion
13: Flank face along corner-side outer blade edge portion
14: Margin
15: Bolt insertion hole
2: Head main body
2a: Distal end surface
20: Hollow portion
21, 22: Cutting chip discharge port
2A: Center cutting blade tip (cutting blade tip responsible for cutting the center)
20: Blade edge
20a: Inner end
3A: Center cutting blade body
3B: circumferential cutting blade body
3C: Intermediate portion cutting blade body
5: Mounting plate
7: Guide pad
C: Uncut core
D1: Uncut core break-off type drill head for deep-hole drilling
D2: Whole cutting type drill head for deep-hole drilling
O: Head shaft center axis
P1: First section facing a drilling direction
P2: Second section facing a head shaft center axis side
P3: Third section facing a head circumference side
R: Radial line
T1, T2: Throwaway tip for deep-hole drilling
W: Work material
Z: Non-cutting zone
f: Distance (center-raised amount)
s: Distance (eccentric distance)
α: Inner cutting blade angle
β1, β2: Outer blade edge angle
γ: Crossing angle
θ: Flank angle

DETAILED DESCRIPTION

Figure 2:
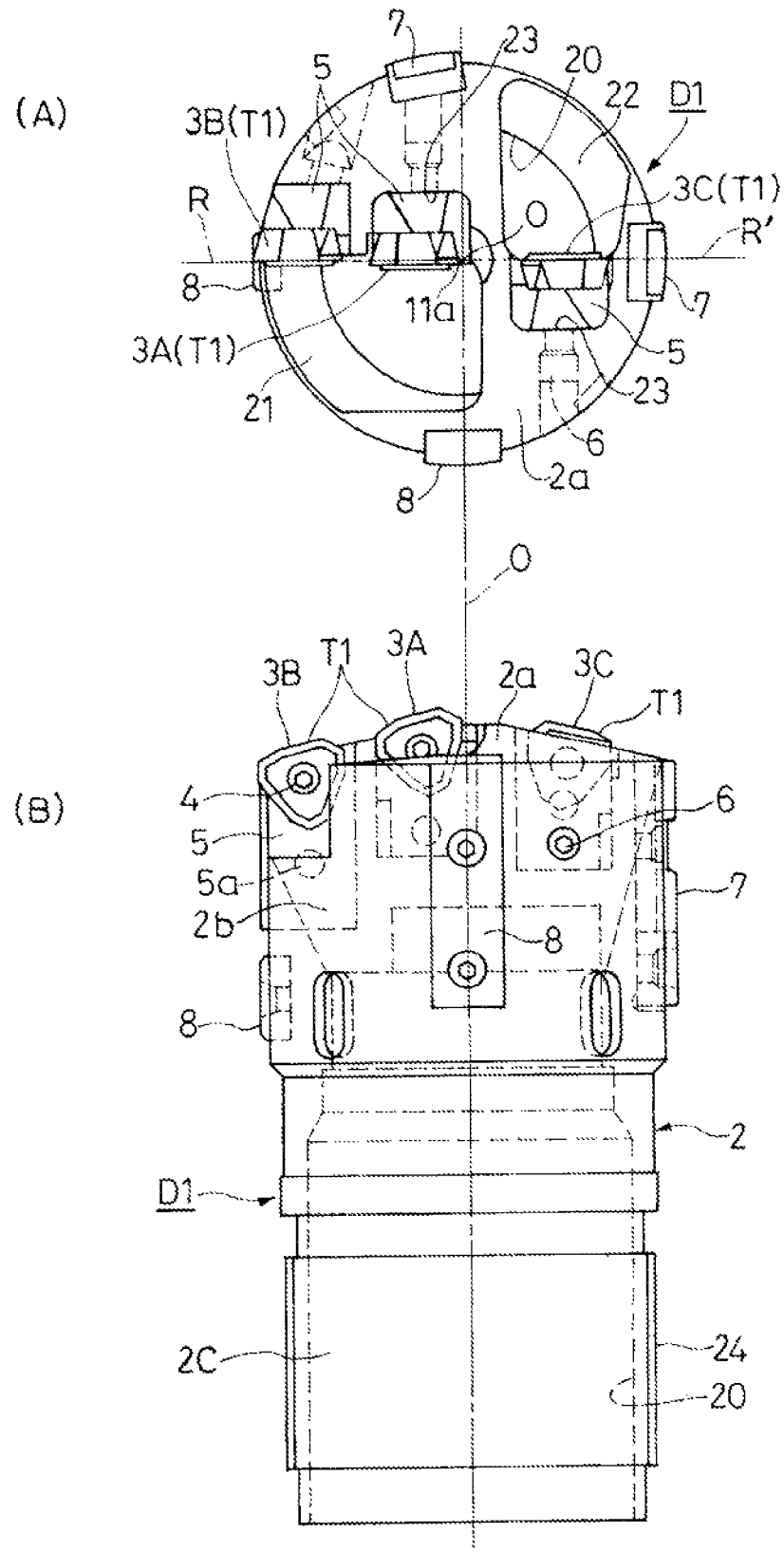
FIG. 2 shows an uncut core break-off type drill head for deep-hole drilling employing the above throwaway tip.
Figure 3:
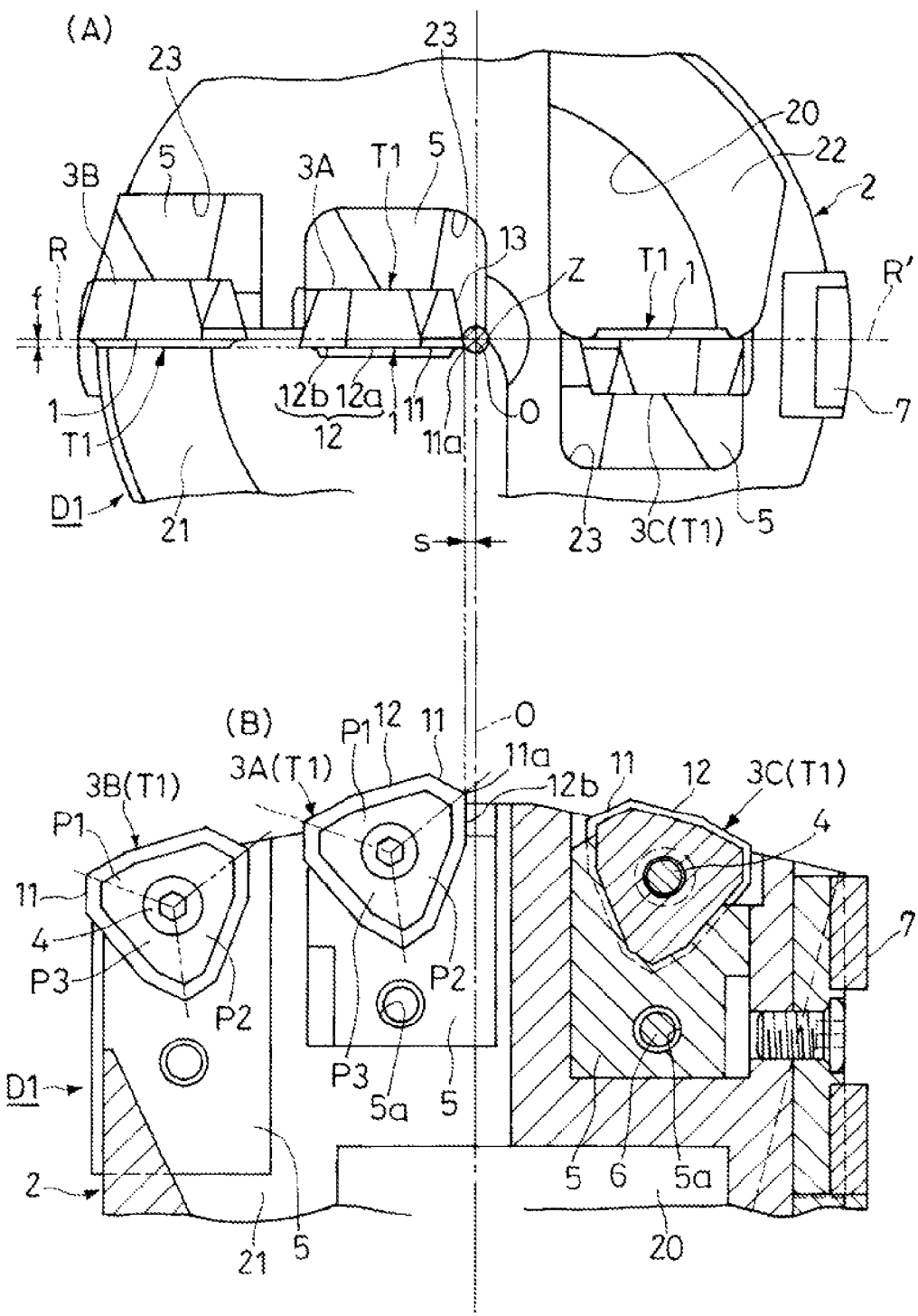
FIG. 3 shows a main part of a distal end side of the above drill head in an enlarged manner.
Figure 4:
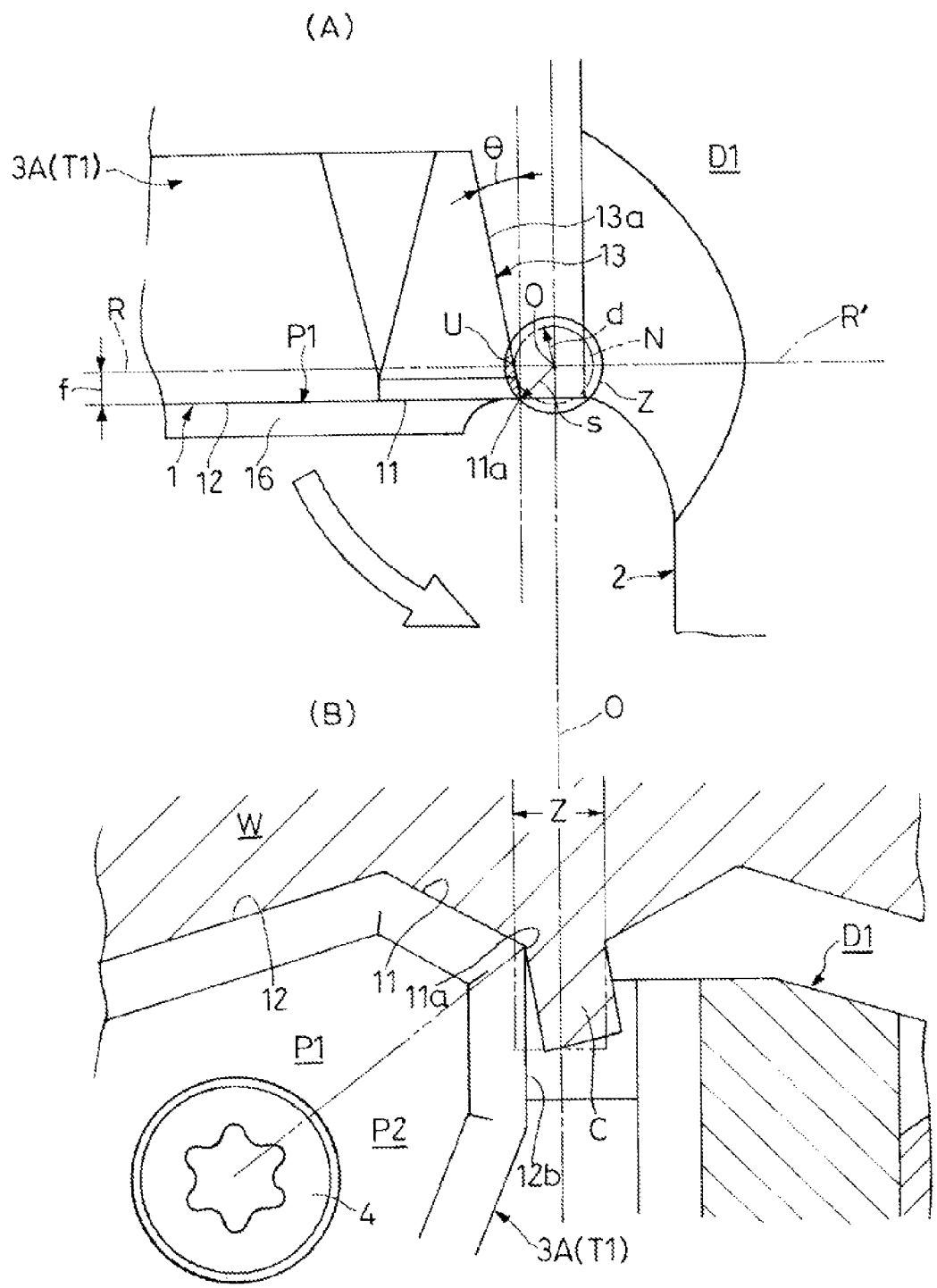
FIG. 4 shows a behavior of a cutting central portion in deep-hole drilling work by the above drill head.
Figure 5:
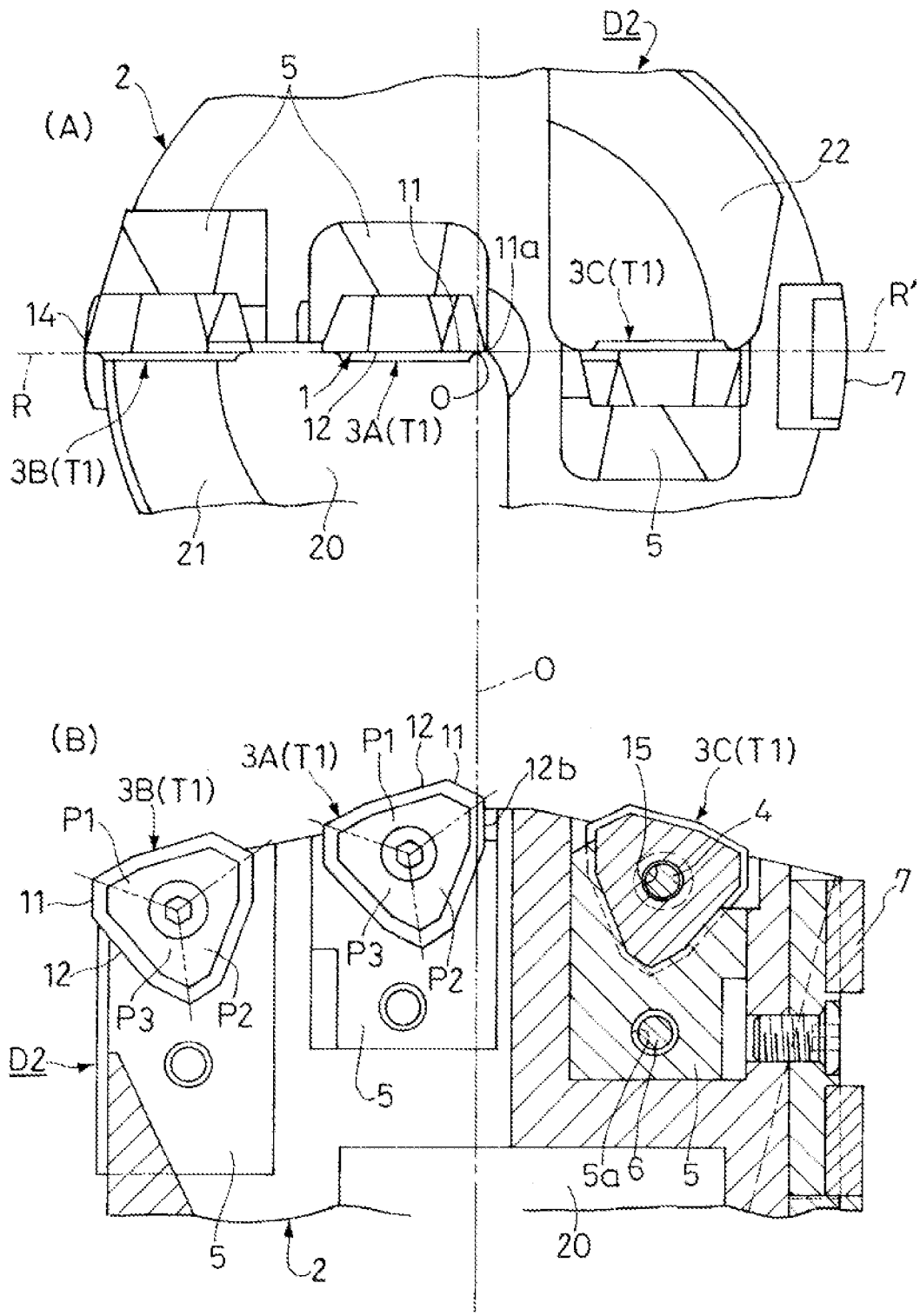
FIG. 5 shows a main part of a distal end side of a whole cutting type drill head for deep-hole drilling employing the above throwaway tip in an enlarged manner.
Figure 6:
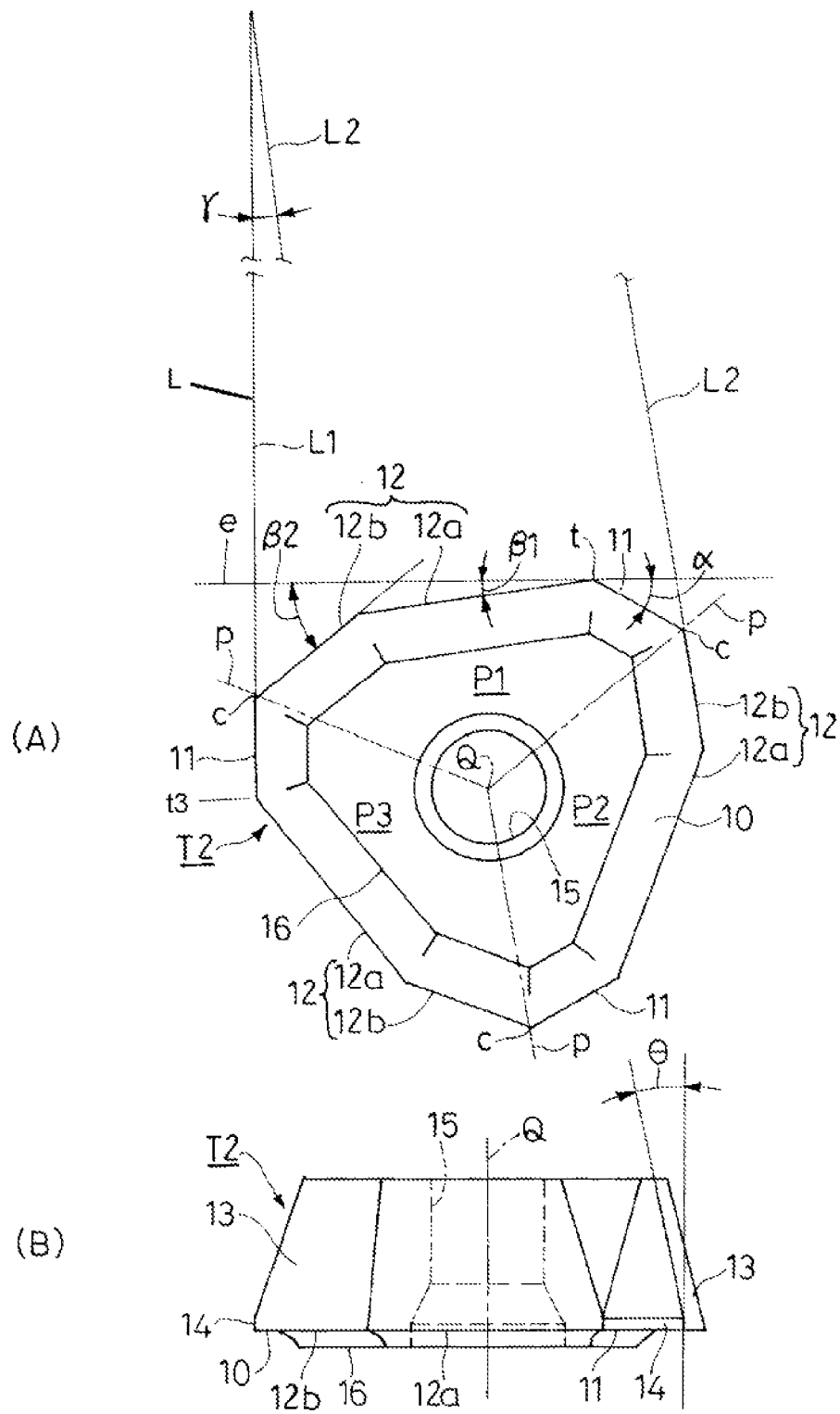
FIG. 6 shows a throwaway tip for deep-hole drilling according to a second embodiment of the present invention.
Figure 7:
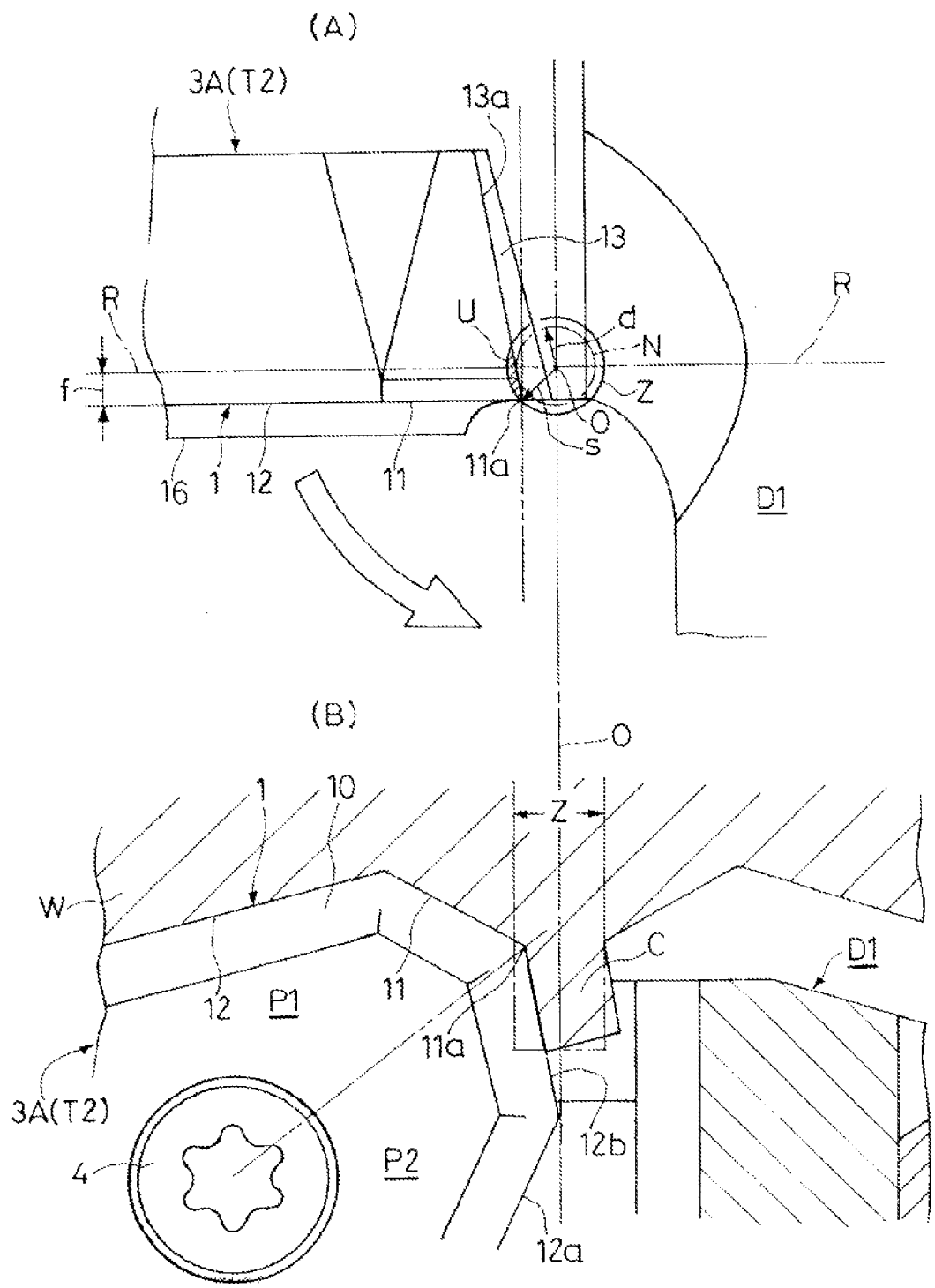
FIG. 7 shows a behavior of a cutting central portion in deep-hole drilling work by an uncut core break-off type drill head for deep-hole drilling employing the throwaway tip for deep-hole drilling of the second embodiment.
Figure 8:
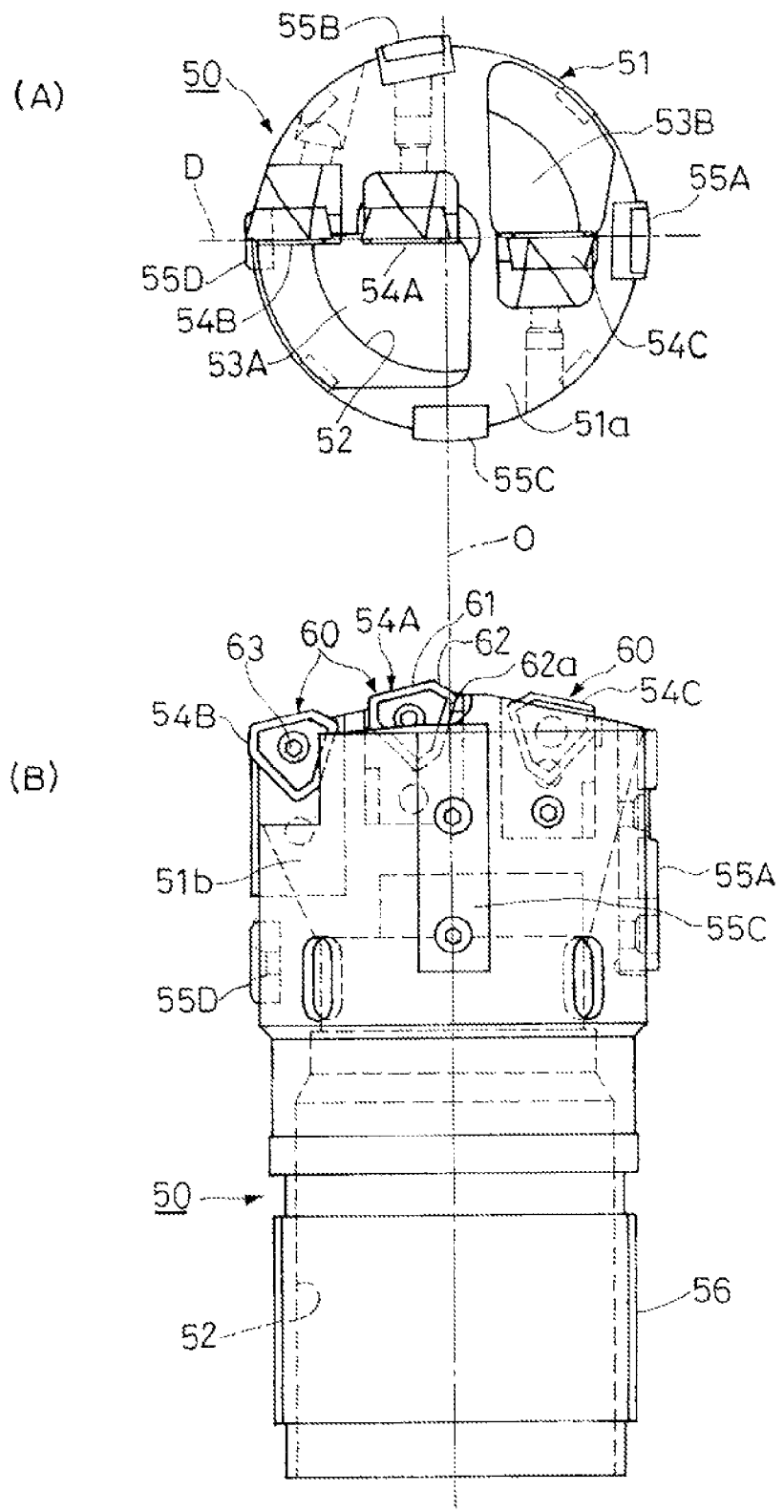
FIG. 8 shows a configuration example of a conventional drill head for deep-hole drilling.

Hereinafter, embodiments of the present invention will be described in detail with reference to the drawings. FIG. 1 shows a throwaway tip for deep-hole drilling T1 according to a first embodiment of the present invention, FIG. 2 shows an uncut core break-off type drill head D1 employing the throwaway tip T1, FIG. 3 shows a distal end side of the drill head D1, FIG. 4 shows a behavior of a cutting central portion in the drill head D1, FIG. 5 shows a distal end side of a whole cutting type drill head D2 employing the throwaway tip T1 of the first embodiment, FIG. 6 shows a throwaway tip for deep-hole drilling T2 according to a second embodiment of the present invention and FIG. 7 shows a behavior of a cutting central portion in an uncut core break-off type drill head D1 employing the throwaway tip T2, respectively.

As shown in FIGS. 1(A) to 1(C), the throwaway tip for deep-hole drilling T1 of the first embodiment has a three-fold symmetry that a sectional shape when divided into three sections at the central angle of 120 degrees is equalized, and roughly forms a substantially equilateral triangular thick plate body. However, each side of the equilateral triangle is slightly bent at two places, and specifically, the throwaway tip forms an enneagon. Regarding an entire periphery forming an outline of the enneagon as a blade edge 1 positioned in one plane, a main surface facing the blade edge 1, that is, a front surface of FIG. 1(A) constitutes a cutting face 10, a peripheral side surface constitutes a flank face 13, a bolt insertion hole 15 penetrating in a thickness direction is provided at the center on the front surface, and a stepped chip breaker 16 is formed on the cutting face 10 along the blade edge 1 of the entire periphery. As seen in these figures, the throwaway tip has blade edges only on one side, and so may be considered a single-sided three-way indexable throwaway tip.

It is noted that the throwaway tip T1 of FIG. 1(A) is shown in a mounting posture on the drill head when an upper side of the sheet is regarded as a drilling direction, and an imaginary transverse line e passing through a section apex t is perpendicular to the drilling direction. Here, a sectional configuration of the three-fold symmetry is such that an upper side as shown is a first cutting section P1 facing the drilling direction, a right side as shown is a second section P2 facing a head shaft center axis side and a left side as shown is a third section P3 facing a head circumference side with reference to sections marked off by demarcation lines P shown by three virtual lines and joining the center Q and respective plate corners c of the substantially equilateral triangle. And, a blade edge 1 in the first cutting section P1 takes charge of deep-hole drilling work in a mounting state on the drill head. When the blade edge 1 in the first cutting section P1 is damaged or reaches its wear limit, its mounting posture is turned 120 degrees, thereby moving a blade edge 1 in the second section or third section which is unused to a position of the first section, and accordingly the blade edge 1 is replaced and the blade body is used three times in total.

Each blade edge 1 in the first to third cutting sections P1 to P3 has an inner blade edge 11 shorter in blade length and an outer blade edge 12 longer in blade length forming an angular shape. The inner blade edge 11 is arranged at the head shaft center axis side and has an inward declivous inner blade edge angle α in the first cutting section P1 responsible for deep-hole drilling work. The outer blade edge 12 is arranged at the head circumference side and has an outward declivous outer blade edge angle in the first cutting section P1 responsible for deep-hole drilling work. Further, the outer blade edge 12 comprises two consecutive blade edge portions including a peak-side outer blade edge portion 12a positioned at a peak (a section apex t) side of the angular shape and having a smaller outer blade edge angle β1 (first angle) relative to the imaginary transverse line e and a corner-side outer blade edge portion 12b having a larger outer blade edge angle β2 (second angle) relative to the imaginary transverse line e. A blade length of the corner-side outer blade edge portion 12b is configured shorter than that of the peak-side outer blade edge portion 12a. The inner blade edges 11, peak-side outer blade edge portions 12a and corner-side outer blade edge portions 12b in the first to third cutting sections P1 to P3 form rotation symmetry equivalent sides about the tip center Q, respectively, and are completely overlapped by a 120 degree turn about the tip center Q. Further, crossing angles of extension lines of these equivalent sides are all 60 degrees.

Further, as shown in FIG. 1(B) and FIG. 1(C), a margin 14 having an about 0.1 to 2 mm width and an about 1 to 6 degree inclination angle with respect to a tip thickness direction is formed at a portion along each inner blade edge 11 of the tip peripheral side surfaces. A flank angle (inclination angle with respect to the tip thickness direction) θ of a flank face 13 along each corner-side outer blade edge portion 12b is set at 5 to 15 degrees, and flank angles of the other tip peripheral side surfaces are in the range of about 10 to 30 degrees. It is noted that, preferably, an apex angle of the section apex t is not less than 130 degrees and an inner blade edge angle α relative to the imaginary transverse line e is larger than an outer blade edge angle β1 (first angle) of the peak-side outer blade edge portion 12a (α>β1). A preferred example of these angle settings includes a flank angle θ of the flank face 13=11 degrees, an apex angle of the tip section t=138 degrees, an inner blade edge angle α=30 degrees, an outer blade edge (first) angle β1=12 degrees and an outer blade edge (second) angle β2=18 degrees. Thus, in one embodiment, the inner blade edge angle α is greater than the outer blade edge second angle β2, which in turn is greater than the outer blade edge first angle β1. It is noted that all of these angles are taken relative to the imaginary transverse line e which passes though the section apex t. Imaginary transverse line e is perpendicular to a longitudinal imaginary reference line L along which the inner blade edge 11 of adjacent cutting section P3 extends, between an adjacent plate corner c where cutting sections P1 and P3 meet and section apex t3 of adjacent cutting section P3.

Therefore, the throwaway tip T1 of the first embodiment is configured such that the inner blade edge 11 in the first cutting section P1 and the corner-side outer blade edge portion 12b in the third section P3, the inner blade edge 11 in the second section P2 and the corner-side outer blade edge portion 12b in the first cutting section P1, and the inner blade edge 11 in the third section P3 and the corner-side outer blade edge portion 12b in the second section P2 are arranged in parallel, respectively, and the inner blade edge 11 in the third section P3 and the corner-side outer blade edge portion 12b in the second section P2 in the mounting posture on the drill head as shown in FIG. 1(A) are along the drilling direction.

A drill head D1 as shown in FIG. 2(A) and FIG. 2(B) has a substantially cylindrical head main body 2 having a head shaft center axis O defining a forward-to-rear direction. The head main body 2 has a hollow portion 20 opened at a proximal end side and a substantially conical-shaped head distal end surface 2a formed with one large and one small substantially fan-shaped cutting chip discharge ports 21, 22 arranged in radially opposed positions to each other and communicating with the hollow portion 20. The throwaway tip T1 of the first embodiment as described above is used for a center cutting blade body 3A and a circumference side blade body 3B on an opening side edge of the large cutting chip discharge port 21 along a radial line R passing through a head shaft center axis O and an intermediate portion blade body 3C on an opening side edge of the small cutting chip discharge port 22 along a radial line R' on the radially opposite side, respectively. The throwaway tip T1 of the center cutting blade body 3A is arranged in an uncut core break-off type manner.

Each throwaway tip T1 is screw-clamped by a fixing bolt 4 having passed through a bolt insertion hole 15 at the center thereof in a state where a part thereof projects to one side in a longitudinal direction of one side surface of a substantially square shaft shaped tip mounting plate 5. The tip mounting plate 5 is fitted into a recessed portion 23 provided to the head main body 2 side, and a mounting bolt 6 having been inserted from an outer circumferential surface 2b of the head main body 2 is threadedly engaged with a threaded hole 5a of the tip mounting plate 5 to accommodate the throwaway tip T1, whereby the throwaway tip T1 is fixed on the head main body 2. Further, on the head outer circumferential surface 2b at the distal end side of the head main body 2, guide pads 7 of cemented carbide material are screw-clamped at the mounting side of the intermediate portion blade body 3C and the rear side of the center cutting blade body 3A, and auxiliary guide pads 8 are screw-clamped at positions radially opposed to the guide pads 7. Further, a male thread 24 is formed on a head outer circumferential surface 2c at the proximal end side of the head main body 2 whose outer diameter is made smaller than the distal end side, and the proximal end side is screwed into a distal end portion having a female thread of a hollow boring bar (not shown), thereby coupling the drill head D1 to a distal end of the boring bar.

The three throwaway tips T1 are all in such a mounting state that the outer blade edge 12 longer in blade length in the first cutting section P1 facing the drilling direction is inclined forwardly and upwardly towards the head shaft center axis O and the inner blade edge 11 in the third section facing the head outer circumference side is along the drilling direction. As shown in FIG. 3(A) in detail, the circumference side blade body 3B and the intermediate portion blade body 3C are arranged in such a manner that the blade edges 1 are made in agreement with the radial lines R, R' passing through the head shaft center axis O, whereas the center cutting blade body 3A is arranged such that the inner end 11a of the inner blade edge 11 in the first cutting section P1 is spaced apart by a distance s from the head shaft center axis O in a position where the blade edge 1 is parallel to the radial line R and a center thereof is raised by a distance f more forward in the cutting rotation direction than the radial line R, due to the uncut core break-off type. Further, in this arranging state, the corner-side outer blade edge portion 12b at the adjacent second section P2 facing the head center side in the throwaway tip T1 of the center cutting blade body 3A (see FIG. 3(B)) is parallel to the head shaft center axis O.

In deep-hole drilling work by the above-described drill head D1 for deep-hole drilling, a coolant supplied through a gap between an inner circumference of a cutting hole and an outer circumference of the hollow boring bar and drill head D1 is sent into a cutting region continuously while the drill head D1 coupled to the boring bar as already described above or a work material W is rotated, cutting chips generated in the cutting region are caught in the coolant, passed through the hollow portion 20 and a hollow inside of the boring bar from the cutting chip discharge ports 21, 22 of the drill head D1, and discharged outside.

The inner end 11a of the inner blade edge 11 at the first cutting section P1 facing the drilling direction of the throwaway tip T1 used for the center cutting blade body 3A is spaced apart from the head shaft center axis O in this deep-hole drilling work, and accordingly a circular non-cutting zone Z whose radius is an eccentric distance s is formed in the vicinity of the shaft center O as shown in FIG. 4(A) and FIG. 4(B), and an uncut core C of a work material W is generated in this non-cutting zone Z. Since the above throwaway tip T1 is in a center-raised position and the flank face 13 of the corner-side outer blade edge portion 12b at the second section P2 in the above throwaway tip T1 has a flank angle θ of 5 to 15 degrees, the shortest distance d of a drilling-direction edge 13a of the flank face 13 with respect to the head shaft center axis O becomes shorter than the eccentric distance s of the inner end 11a of the inner blade edge 11, whereby the edge 13a enters into the non-cutting zone Z by as much as a shaded portion U as shown.

Therefore, the uncut core C generated in the non-cutting zone Z is press-contacted from the side by the flank face 13 just after the generation and forcibly pushed away laterally as shown in FIG. 4(B), and also twisted by consecutive changes in the pushed-away direction in line with rotation of the drill head D1, pushed and cut from the side by as much as the flank face 13 enters into the non-cutting zone Z, and constricted to a circle N having a smaller radius d than the non-cutting zone Z. As a result, the uncut core C is fragmented little by little without growing long, whereupon excellent cutting chip dischargeability is secured during deep-hole drilling work, and high cutting efficiency is attained in cooperation with an elimination of the chisel edge in the shaft center position. In the case of this drill head D1, the flank face 13 along the corner-side outer blade edge portion 12b in the second section P2 facing the head shaft center axis side is parallel to the head shaft center axis O, and accordingly the press-contact by the flank face 13 relative to the uncut core C becomes more reliable, and the little by little fragmentation of the uncut core C is efficiently carried out.

Further, the throwaway tip T1 used for the center cutting blade body 3A in this drill head D1 has only to be in an appropriately center-raised position and have the inner end 11a of the inner blade edge 11 in the first cutting section P1 appropriately spaced apart from the head shaft center axis O. Therefore, exact arranging accuracy in the head main body 2 is not required, and the manufacturing and processing of the mounting plate 5 and mounting operation of the throwaway tip T1 are facilitated accordingly.

It is noted that when the flank angle of the flank face 13 of the corner-side outer blade edge portion 12b is below 5 degrees, a problem is caused in cutting function of the corner-side outer blade edge portion 12b in the first cutting section P1 facing the drilling direction. On the contrary, when the flank angle exceeds 15 degrees, the entering by the edge 13a of the flank face 13 into the non-cutting zone Z becomes deficient, and as a result, the fragmentation performance of the uncut core C is reduced.

A drill head D2 as shown in FIG. 5(A) and FIG. 5(B) has a specification of the whole cutting type. The same throwaway tip T1 is mounted at the center, circumference and intermediate portion of the same head main body 2 as the drill head D1 of an uncut core beak-off type as described above. However, the center cutting blade body 3A is arranged in the same manner as the circumference side and the intermediate portion blade body 3B, 3C that the blade edge 1 is made in agreement with the radial line R passing through the head shaft center axis O and the inner end 11a of the inner blade edge 11 in the first cutting section P1 facing the drilling direction is arranged in a position slightly beyond the head shaft center axis O. Therefore, according to this drill head D2, the deep-hole drilling work by the normal whole cutting type can be carried out without any problem.

In the drill heads D1, D2 as described above, the throwaway tip T1 used for the circumference side blade body 3B is such that the inner blade edge 11 in the third section P3 facing the head circumference side is arranged along the drilling direction and slidingly line-contacts with an inner circumference of a cutting hole. In addition to that the inner blade edge 11 has a large blade edge angle due to the margin 14 and thus is highly strengthened, the margin 14 portion also slide-contacts with the inner circumference of the cutting hole, so that abrasion of the inner blade edge 11 is reduced and the inner blade edge 11 resists damage. Consequently, the throwaway tip T1 exerts excellent durability also as the circumference side blade body 3B large in linear velocity. Furthermore, since the same throwaway tip T1 is used for all blade bodies 3A to 3C and they are in the same mounting posture, manufacturing costs can be reduced remarkably due to commonality of components and uniformalization of assembly operation. Further, the outer blade edge 12 longer in blade length at the first cutting section P1 facing the drilling direction for every throwaway tip T1 is inclined forwardly and upwardly towards the head shaft center axis O side, and thus, the radial force of the cutting reaction force is directed to the head shaft center axis side, the throwaway tip T1 resists axis runout, and drilling accuracy of a cutting hole is also advantageously improved accordingly.

A throwaway tip for deep-hole drilling T2 of the second embodiment as shown in FIG. 6(A) and FIG. 6(B) is again of roughly equilateral triangular, and specifically an enneagonal thick plate body and has a three-fold symmetry. Since the throwaway tip T2 has substantially the same configurations as the throwaway tip T1 of the first embodiment except for a part, common parts with the first embodiment are denoted by the same reference numerals and their description is omitted.

In the throwaway tip T2 of the second embodiment, a difference between outer blade edge angles β1, β2 of the peak-side outer blade edge portion 12a and the corner-side outer blade edge portion 12b of each outer blade edge 12 (a bending between both outer blade edge portions 12a, 12b) is made larger than that of the first embodiment, whereby the inner blade edge 11 in the first cutting section P1 and the corner-side outer blade edge portion 12b in the adjacent third section P3, the inner blade edge 11 in the second section P2 and the corner-side outer blade edge portion 12b in the first cutting section P1, and the inner blade edge 11 in the adjacent third section P3 and the corner-side outer blade edge portion 12b in the second section P2 become unparallel, respectively. Further, in a mounting posture on the drill head as shown in FIG. 6(A), the adjacent inner blade edge 11 in the adjacent third section P3 is arranged along the drilling direction while the corner-side outer blade edge portion 12b in the second section P2 is arranged inclined with respect to the drilling direction such that an extension line L2 forward in the drilling direction of a blade edge thereof intersects with an extension line L1 of that of the inner blade edge 11. A crossing angle γ of these extension lines L1, L2 is about 5 to 30 degrees. Thus, the adjacent inner blade edge 11 in the adjacent third section P3 converges with the corner-side outer blade edge portion 12b at this acute crossing angle γ of about 5 to 30 degrees.

When this throwaway tip T2 is used for the afore-described uncut core break-off type drill head D1, as shown in FIG. 7(A) and FIG. 7(B), the center cutting blade body 3A is again such that the blade edge 1 is arranged in parallel with the radial line R and in a center-raised position by a distance f more forward in the cutting rotation direction than the radial line R, and the inner end 11a of the inner blade edge 11 in the first cutting section P1 facing the drilling direction is spaced apart by a distance s from the head shaft center axis O, thereby forming the non-cutting zone Z. Thus, if the inner blade edge 11 in the third section facing the head circumference side is made to take a mounting posture of being parallel to the drilling direction in this throwaway tip T2, the corner-side outer blade edge portion 12b in the second section P2 facing the head shaft center axis side is inclined with respect to the head shaft center axis O as shown in FIG. 7(B), and the flank face 13 along this corner-side outer blade edge portion 12b is, as a result, inclined as well with respect to the head shaft center axis O as shown in FIG. 7(A).

Therefore, the uncut core C generated in the non-cutting zone Z is press-contacted from the side by the flank face 13 just after the generation, forcibly pushed away laterally, twisted due to consecutive changes in the pushed-away direction, pushed and cut from the side by as much as the flank face 13 enters into the non-cutting zone Z, and constricted to a circle N whose radius d is smaller than the non-cutting zone Z in the same manner as in the throwaway tip T1 of the first embodiment. Additionally, an inclination of the flank face 13 gradually increases the entering into the non-cutting zone Z. Since the degree of lateral displacement from the head shaft center axis O increases as the uncut core C becomes longer, the uncut core C cannot grow long and is efficiently fragmented little by little more reliably.

It is noted that when an inclination angle of the corner-side outer blade edge portion 12b in the second section P2 with respect to the head shaft center axis O, that is, a crossing angle γ of the extension lines L1, L2 in the afore-described FIG. 6(A) exceeds 30 degrees, the break-off of the uncut core C becomes difficult, and cutting resistance increases significantly.

On the other hand, in the drill head D1 as exemplified in FIGS. 2 to 4, three of throwaway tips T1 of the first embodiment are all in such a mounting posture that the inner blade edge 11 in the third section P3 facing the head circumference side is along the drilling direction, and accordingly the center cutting blade body 3A has the corner-side outer blade edge portion 12b in the second section P2 facing the head center side being parallel to the head shaft center axis O. However, the center cutting blade body 3A and the intermediate portion blade body 3C which do not contact with the inner circumferential surface of a cutting hole are not required to be along the drilling direction as in the inner blade edge 11 in the third section P3 facing the head circumference side. Therefore, even when the throwaway tip T1 of the first embodiment is used, as for the center cutting blade body 3A, changing its mounting posture from the one in FIGS. 2 to 4 to the one slightly turned counterclockwise, inclines the corner-side outer blade edge portion 12b in the second section P2 facing the head center side with respect to the head shaft center axis O as in the case of using the afore-described throwaway tip T2 of the second embodiment, and an inclination of the flank face 13 thereof allows fragmentation performance of the uncut core C to be improved.

The eccentric distance of the throwaway tip T1, T2 used for the center cutting blade body 3A, more specifically, the eccentric distance s of the inner end 11a of the inner blade edge 11 in the first cutting section P1 facing the drilling direction from the head shaft center axis O is preferably in the range of 0.05 to 0.5 mm in the drill head for deep-hole drilling of the present invention. If too short, positioning of the throwaway tip becomes difficult, whereas if too long, the uncut core C becomes thick, which requires a large force for break-off and leads to a reduction in cutting efficiency. Furthermore, a center-raised amount of the center cutting blade body 3A, in other words, a distance f of the blade edge 1 with respect to the radial line R about the head shaft center axis O is preferably in the range of 0.2 to 1.5 mm for the purpose of further ensuring the little by little break-off of the uncut core C.

It is noted that the exemplified drill heads D1, D2 for deep-hole drilling include three blade bodies 3A to 3C, but the present invention can be applied to a drill head provided with four or more blade bodies. Moreover, detailed configurations such as the shape of the cutting chip discharge ports 21, 22, the shape of the mounting plate 5, the mounting position and the number of the guide pads, etc., can be modified in various ways except for the exemplifications in the drill head of the present invention.

What is claimed is:

1. A three-way indexable throwaway tip for deep-hole drilling comprising:
 a plate body having three convex cutting sections rotationally spaced apart from one another by 120 degrees;
 a plate corner between each pair of adjacent convex cutting sections;
 each convex cutting section comprising a blade edge between a first plate corner and an adjacent second plate corner, the blade edge comprising:
  an inner blade edge linearly extending between the first plate corner and a section apex; and
  an outer blade edge extending between the section apex and the adjacent second plate corner, the outer blade edge being longer than the inner blade edge and comprising a peak-side outer blade edge portion and a corner-side outer blade edge portion, the peak-side outer blade edge portion forming an obtuse angle with the corner-side outer blade edge portion, the peak-side outer blade edge portion being connected to the section apex, the corner-side outer blade edge portion being connected to the adjacent second plate corner;
 wherein, in a front view of the throwaway tip:
  an adjacent inner blade edge extends along a longitudinal imaginary reference line (L) between the adjacent second plate corner and an adjacent section apex;
  a transverse imaginary line (e) perpendicular to the longitudinal imaginary reference line (L) contains the section apex;
  the inner blade edge forms an inner blade edge angle (a) with the transverse imaginary line (e);
  the peak-side outer blade edge portion forms a first angle ($\beta_1$) with transverse imaginary line (e);
  the corner-side outer blade edge portion forms a second angle ($\beta_2$) with transverse imaginary line (e); and
  the second angle is greater than the first angle;
 and wherein:
  the adjacent inner blade edge, and a second corner-side outer blade edge portion which belongs to a second convex cutting section and is connected to the first plate corner,
are parallel to one another.

2. A three-way indexable throwaway tip for deep-hole drilling comprising:
a plate body having three convex cutting sections rotationally spaced apart from one another by 120 degrees;
a plate corner between each pair of adjacent convex cutting sections;
each convex cutting section comprising a blade edge between a first plate corner and an adjacent second plate corner, the blade edge comprising:
an inner blade edge linearly extending between the first plate corner and a section apex; and
an outer blade edge extending between the section apex and the adjacent second plate corner, the outer blade edge being longer than the inner blade edge and comprising a peak-side outer blade edge portion and a corner-side outer blade edge portion, the peak-side outer blade edge portion forming an obtuse angle with the corner-side outer blade edge portion, the peak-side outer blade edge portion being connected to the section apex, the corner-side outer blade edge portion being connected to the adjacent second plate corner;

wherein, in a front view of the throwaway tip:
an adjacent inner blade edge extends along a longitudinal imaginary reference line (L) between the adjacent second plate corner and an adjacent section apex;
a transverse imaginary line (e) perpendicular to the longitudinal imaginary reference line (L) contains the section apex;
the inner blade edge forms an inner blade edge angle (a) with the transverse imaginary line (e);
the peak-side outer blade edge portion forms a first angle ($\beta_1$) with transverse imaginary line (e);
the corner-side outer blade edge portion forms a second angle ($\beta_2$) with transverse imaginary line (e); and
the second angle is greater than the first angle;
and wherein:
an extension line of the adjacent inner blade edge, and
an extension line of a second corner-side outer blade edge portion which belongs to a second convex cutting section and is connected to the first plate corner,
converge in a direction opposite a third plate corner and intersect one another at an acute angle ($\gamma$) which is in the range of between 5 and 30 degrees.

* * * * *